United States Patent Office 3,509,656
Patented May 5, 1970

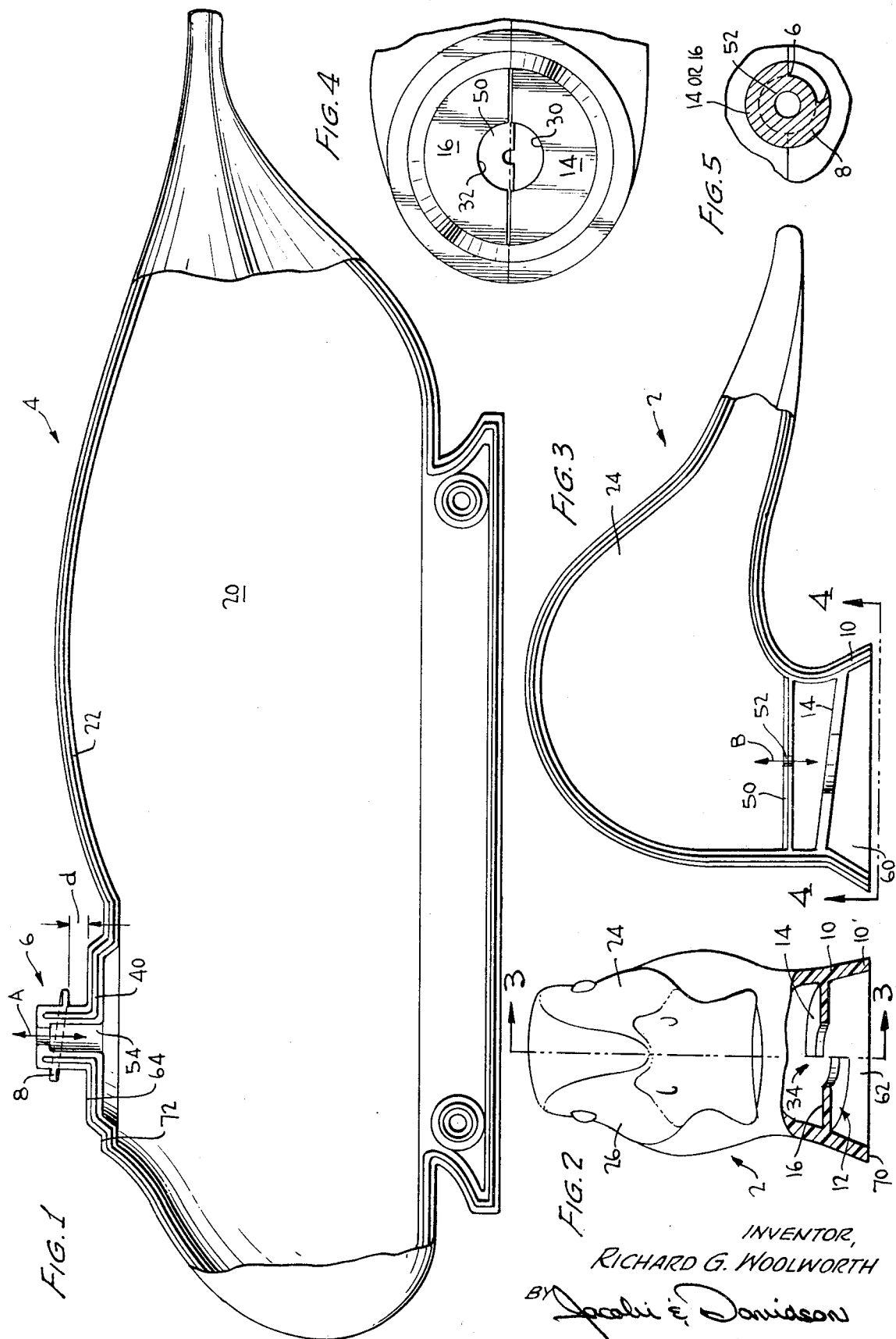

3,509,656
DECOY CONSTRUCTION
Richard G. Woolworth, Lancaster, Pa., assignor to Woodstream Corporation, Lititz, Pa., a corporation of Pennnsylvania
Filed July 12, 1968, Ser. No. 744,453
Int. Cl. A01m 31/06
U.S. Cl. 43—3          8 Claims

ABSTRACT OF THE DISCLOSURE

A decoy has a head portion and a main body portion releasably joined by thread means constructed to permit continued rotation of the head portion in one direction with respect to the body portion and to permit frictionally fixing the head portion in any desired relation with respect to the body portion. Additionally the arrangement permits breathing through the cooperating thread means into or out of the hollow portions of the decoy. The head portion and the body portion are provided with cooperating sealing faces which are engageable, with normal cooperation between the thread means, to substantially preclude any significant amount of liquid from entering the decoy, and yet so as to simultaneously afford the requisite breathability.

Background of invention

This invention relates to decoys, and finds particular utility when employed in connection with duck decoys, although as will be appreciated hereinafter, the invention is not limited in application to duck decoys.

Various types of duck decoys have previously been manufactured and widely distributed. For convenience in presentation and facility in understanding, the prior decoys can be grouped into two types. The first type of decoy which has been commercially significant includes a pair of molded sections, which when joined together provide a unitary main body portion and head portion, normally with the junction therebetween or seam running vertically transversely of the body. Since the head is joined in integral relation to the body, the head is not movable, and thus the user is not permitted to exhibit his full skills in using the decoy. Moreover, in order to prevent damage to the decoy by virtue of expansion and contraction, some means must be provided to make the decoy breathable. This means has taken the form of an aperture in the body, and/or in the head, but in either event, when the decoy is floated in water, the water can enter the aperture or other opening and under undesirable conditions, and/or by accident, the decoy can sink.

The other type of decoy can generally be considered as a so-called "adjustable head" decoy. If this type has not found widespread commercial utility, at least this type is disclosed in the prior patent literature. Generally, some coupling means is provided between the head portion and the main body portion of the decoy so that such portions can be releasably joined together. However, in most all instances of practical construction, the juncture is such that the coupling means must be loosened to achieve the desired position and then tightened. Once the head is moved to the desired position, in other words, then some element is tightened to maintain the same there, thus requiring additional manipulation, or alternatively, the juncture is the source of leaks and this type of decoy is subject to the same potential sinking problems as the integrally molded decoy. Furthermore, with the second type of decoy, the aforesaid problems associated with breathability are not eliminated.

Objects of invention

There thus remains a need for a decoy which can breathe without significant chance of sinking from water inflow, and which has an adjustable head that does not require difficult manipulation to position. The object of the present invention is to satisfy this need.

Consistent with such primary object of the present invention, it is a further object of this invention to provide a decoy comprising a main body portion and a head portion which are releasably joined together by thread means so that the head portion can be adjusted to any desired position by rotation in a given direction, and so that it is virtually impossible to "over tighten" the head or damage the decoy by virtue of the adjustment. In this regard, a still further object of the present invention is to provide such a decoy wherein rotation of the head in one direction with respect to the body portion either gives the normal desired cooperative relationship, or if this is temporarily not maintained, still keeps the head in engaged relation with the body so that the head is not accidentally lost or dropped.

Another aspect of the present invention, as should be apparent from the preceding discussion, concerns the breathability. To this end, it is a specific object of the invention to provide an improved decoy construction having a releasable and preferably hollow head portion, a hollow body portion, thread means for joining the two portions together, and passageways from the interior of the hollow portions through the thread portions to permit breathing. A still more specific object of the invention in this particular connection is to provide such a decoy wherein the head portion and the body portion include cooperating engaging or sealing faces so that when the head portion is normally joined to the body portion, the sealing faces substantially preclude the inflow of liquid to the interior of the decoy, but at the same time permit the influx or outflow of air or other gas within the decoy, thereby making the same breathable and not subject to damage due to expansion and contraction of the air or other gas trapped within the hollow sections of the decoy.

Brief description of preferred embodiments

Consistent with the invention, the preceeding objects are achieved in a decoy having a head portion and a main body portion by providing one of the portions with post means with a first thread means thereon, by providing the other of the portions with an interrupted second thread means thereon, and by having the first and second thread means cooperable to secure the head portion on the main body portion, with the cooperating relationship between the thread means being sufficient frictionally to allow the head to be fixed in position as the user desires.

With respect to breathability, the invention provides cooperating thread means on the head portion and the main body portion to releasably secure such portions together, and further provides the head portion with a columnar neck portion terminating in a sealing face. The main body portion has a cooperating sealing face disposed to engage the sealing face on the head portion when the thread means are in normal cooperation, and passageway means communicate the interior of the hollow portions of the decoy through the thread means with the engaging faces. The engaging faces, when disposed in normal engaging relation, provide a sufficient seal to preclude substantial entry of water into the hollow portions while still allowing sufficient air to pass therebetween to make the decoy breathable to the extent necessary to preclude damage thereto from expansion and contraction.

The invention will be better understood and objects other than those specifically set forth above will become apparent, when consideration is given to the following detailed description. Such description makes reference to preferred and illustrative embodiments of the invention presented in the annexed drawings.

In the drawings:

FIGURE 1 is a transverse longitudinal view, partially in section, of the body portion of a decoy constructed in accordance with the present invention;

FIGURE 2 is a front view, partially broken away in the lower segment thereof, of the head portion of a decoy constructed in accordance with the preferred embodiment hereof;

FIGURE 3 is a transverse sectional view taken on the line 3—3 of FIGURE 2 and showing preferred internal structural aspects of the head portion of the decoy;

FIGURE 4 is a plan view of the preferred form of thread means used on the head portion of a decoy constructed in accordance herewith;

FIGURE 5 is a fragmental sectional view showing the cooperating relationship between the preferred form of thread means on the head portion and the cooperating thread means and post portion preferably provided on the body section of the decoy.

Referring first to FIGURES 1 and 2, it will be noted that the decoy means provided hereby comprises a head portion generally designated by the numeral 2 and a main body portion generally designated by the numeral 4. The main body portion 4 carries a post means 6 at the upper forward end thereof, and this post means has a thread means 8 thereon. Similarly, the head portion 2 has a columnar neck section 10 which carries on the interior thereof an interrupted thread arrangement generally designated 12. This interrupted thread arrangement comprises a pair of flanges 14 and 16 which extend from the internal wall of the columnar neck portion or section 10. The thread arrangement 12 cooperates with the thread means 8 to secure the head portion 2 on the main body portion 4 in normal operation.

The main body portion 4, like the head portion 2, is desirably formed of a moldable plastic of any well known type. The body portion 4 thus includes two longitudinal halves or sections, one of which is shown in FIGURE 1 and designated by the numeral 20. A corresponding section is provided which is joined to the section 20 peripherally thereof preferably by means of adhesive and a conventional tongue and groove type joint disposed peripherally, as about the edge portion 22.

In a similar manner, the head portion 2 comprises a pair of sections which as shown in FIGURE 2 are joined together to provide the head itself. These sections 24 and 26 have a joint therebetween which is substantially identical to the joint between the sections of the main body portion.

The section 24 of the head portion 2 is shown in side elevation in FIGURE 3. It will be noted that this head portion 24 has the thread 14 disposed thereon, such thread being an internally projecting flange extending radially inward from the interior wall of the neck portion 10. The flange 14 as shown in the FIGURE 4, has its inner edge 30 arcuately recessed, and similarly the flange 16 has its inner edge 32 arcuately recessed. When the respective sections 24 and 26 are joined together, the respective arcuate flanges 14 and 16 provide a spiral thread which is interrupted at opposed sides of the recesses 30 and 32—i.e., in the area 34 of FIGURE 2.

Referring again to FIGURE 1, it will be noted that the thread 8 on the post means 6 is preferably a continuous spiral thread, and moreover this thread is disposed on the post 6 in spaced relation to the junction between the post and the adjacent top part of the body portion 4. Specifically, the base of the thread 8 is spaced from the junction 40 by a distance designated $d$ in FIGURE 1.

The thread means on the head portion 2, or in particular in the columnar neck section 10 thereof which is formed by the respective arcuate flanges 14 and 16, being made of suitable plastic, has sufficient flexibility to screw onto and off of the thread means 8 when turned in the same direction. Initially, such thread means 12 engages the thread means 8 so that the head 2 is screwed onto the main body portion 4. With continued rotation in the same direction, the thread means 12 on the head portion 2 essentially "jumps,"—i.e., it turns beyond the thread means 8. Yet, the head does not come free of the body portion because in this instance, when the head is so "screwed-off" of the thread 8, the respective flanges 14 and 16 are disposed in underlying relation to the thread 8 but still in circumferential relation to the post 6 so that the head cannot be readily disengaged from the main body portion 4 until the head is rotated in the opposite direction.

Referring again to FIGURE 3, it will be noted that the head portion 2 includes in the neck section thereof a transverse wall 50, having an aperture 52 therein. The head portion 2, being hollow, is thus communicated through the aperture with the thread means 12. The main body portion 4 is also hollow, and as shown in FIGURE 1, the post 6 has a passageway 54 extending therethrough to communicate the interior of the main body portion 4 also with the thread means, and in particular the thread means 12 carried by the neck portion 10. The neck portion 10, being columnar and having an internal cross section larger than the external cross section of the post 6 and the threads 8 thereon, essentially provides what may be deemed a breathing cavity 60.

To understand the function of this cavity and the manner in which breathing is achieved, it is necessary to first assume that the head portion 2 is screwed onto the body portion 4—i.e., the thread means 12 is in normal engagement with the thread means 8. When such occurs, the interior of the body portion 4 can breathe in or breathe out air through the passageway 54, as indicated by the arrow A. Similarly, at this time, the interior of the head portion 2 can breathe through the aperture 52 in the directions indicated by the arrow B. The thread means 8 and 12 are in engagement, but it will be remembered that the thread means 12 is interrupted. As a result, the air passing in the direction of the arrow A flows into the cavity 60 and can then pass through the interrupted area 34 downwardly into a further cavity section designated as 62.

The cavity section 62 is defined by the lower columnar end 10′ of the neck section 10 and by the wall section 64 in surrounding circumferential disposition to the post 6. When the head 2 is in normal "screwed on" relation to the body 4, the engaging or sealing face 70 which essentially constitutes the lower edge of the neck portion 10, is in cooperating engagement with the sealing face 72 surrounding the wall 64. Thus, the neck portion and the main body portion have engaging faces 70 and 72 which cooperate, when the first and second thread means 8 and 12 are in normal engagement, to effect a seal.

This is not an absolute seal, but is a seal sufficient to preclude substantial inflow of liquid to the interior of the head and main body portions, and yet permit the passage of air between the engaging faces so that the decoy is breathable. The air flow into or out of the head 2 is accordingly past the engaging sealing faces 70 and 72 into the cavity 62 through the interrupted thread means 12, into the cavity 60 and through the aperture 52. Similarly, from the body portion 4 the flow is through the passageway 54 into the cavity 60, through the interrupted thread means 12, into the cavity 62, and then between the sealing faces.

This flow is permitted, as shown by FIGURE 5, since the thread means are in engagement in circumferential relation to the post 6 and since the seal between the head and the body is, in one sense, a seal which prevents the significant entry of any undesired water, but in another sense an area of "leakage" insofar as the gases within the body are concerned.

An auxiliary advantage, not previously mentioned, but which should be understood, concerns the use of the thread flanges 14 and 16 and the configuration thereof. Assume for the moment that the head 2 is screwed onto the body 4 and that the threads are in normal engagement. In this instance, by virtue of the flexibility thereof, there is a frictional cooperation between the thread means 12 and the thread means 8. The user can accordingly position the head in any desired relation to the body, thus increasing his skill in providing a proper simulated duck. Yet, as long as the head 2 is rotated in the same direction, by virtue of the flexibility of the thread flanges 14 and 16, the most that would happen is that the thread means 12 jumps below the thread means 8, thus maintaining the head in engagement with the body, even though not maintaining a tight seal. Under these circumstances, the head can be rotated in either direction, and regardless of the direction of rotation, the thread means 12 thereon immediately comes into engagement with the thread means 8, the interruption facilitating this engagement, and again the decoy is in its normal condition.

In other words, the head threads down onto the body until the face 70 thereof engages the face 72 on the body. If one continues to turn the head in the same direction, the thread flanges 14 and 16 engaging the thread 8, began to exert a force between the surfaces 62 and 72 and as the turning continues, this force increases until the thread "jumps-off" whereupon the force returns to the minimum, until the head is again rotated, whereupon the threading starts over.

One further factor to consider is the use of the transverse wall 50. Should some water enter the decoy through the junction between the engaging faces 70 and 72, the same initially is essentially trapped in the cavity 62. Yet, should it go through the threads upwardly, for one reason or another, it would have to travel more or less peripherally because the central portion of the threads would be an obstacle due to the continuous nature of the thread 8. Such water would then enter the cavity 60 but is unlikely to go into the head because the aperture 52 is centrally located in the transverse wall 50. If the water were to move downwardly, it would have to come up and over the projecting end portion of the thread carrying post 6, namely above the top of the thread. Just for safety purposes, the preferred embodiment contemplates reducing the passageway 54 in diameter at the top of the post, thereby even further safeguarding against the entry of water into the decoy.

Having now described in considerable detail a preferred and illustrative embodiment of the invention, it should be apparent that the objects set forth at the outset of this present specification have been successfully achieved. Accordingly, what is claimed is:

1. In a decoy means comprising a head portion and a main body portion, the improvement comprising:
   (a) one of said portions having post means with a fixed first thread means thereon,
   (b) the other of said portions having fixed interrupted second thread means thereon, and
   (c) said first and second thread means being cooperable to secure said head portion on said main body portion;
   (d) said first thread means being disposed on the said post means in spaced relation to the junction between the said post means and said one portion; and
   (e) said second thread means having sufficient flexibility to screw onto, and off of, said first thread means when turned in the same direction while still engaging said other portion to said one portion with said second thread means disposed, when so screwed off said first thread means, in underlying relation to said first thread means but still in circumferential relation to said post means.

2. The improvement defined in claim 1 wherein:
   (a) said one portion is said main body portion;
   (b) said other portion is said head portion;
   (c) said head portion includes a neck portion in which said second thread means is disposed; and
   (d) said main body portion carries said post means in upstanding relation thereto.

3. The improvement defined in claim 2 wherein:
   (a) said head portion includes a transverse wall disposed in said neck portion above said second thread means, said wall having an aperture therein;
   (b) said head portion is hollow and said aperture communicates the interior of said head portion with said second thread means;
   (c) said main body portion is hollow;
   (d) said post means has passageway means extending therethrough to communicate the interior of said main body portion with said second thread means;
   (e) said neck portion is columnar and has an internal cross-section larger than the external cross-section of said post means and said first thread means; and
   (f) said neck portion and said main body portion have engaging faces cooperating, when said first and second thread means are in normal engagement, in sealing engagement sufficient to preclude substantial inflow of liquid to the interior of said head and main body portions and yet permit the passage of air therebetween so that said decoy is breathable through said aperture, said passageway means, said second thread means and said engaging faces.

4. The improvement defined in claim 1 wherein:
   (a) said other portion has a hollow columnar section;
   (b) and said second thread means comprises at least two arcuate flange means projecting from the interior wall of said hollow columnar section, said flange means having arcuately recessed inner edge portion defining an interrupted spiral thread.

5. The improvement defined in claim 4 wherein at least one of said portions is hollow, wherein said columnar section has a face engageable with said one portion, and wherein air can flow past said face and through said interrupted spiral thread to the interior of said at least one hollow portion.

6. In a decoy means comprising a head portion and a hollow main body portion, the improvement comprising:
   (a) cooperating thread means on said head portion and said main body portion to releasably secure said head portion on said main body portion;
   (b) said head portion having a columnar neck portion terminating in a first sealing face;
   (c) said main body portion having a second sealing face disposed to engage said first sealing face when said thread means are normally cooperating;
   (d) and passageway means connecting the interior of said main body portion through said thread means with said engaging faces; and
   (e) said engaging faces when in normal engagement providing a sufficient seal to preclude substantial entry of water into said main body portion while allowing sufficient air to pass therebetween to make said decoy sufficiently breathable to preclude damage thereto from expansion and contracting of air therewithin.

7. The improvement defined in claim 6 wherein said head portion is hollow and the interior thereof connects with said thread means.

8. The improvement defined in claim 7 wherein said head portion includes a transverse wall in said portion thereof, said transverse wall being disposed above said thread means and having an aperture therein through which the interior of said head portion connects with said thread means.

References Cited

UNITED STATES PATENTS

| 351,709 | 10/1886 | Nye | 43—3 |
| 403,595 | 5/1889 | Jencks | 43—3 |

FOREIGN PATENTS

| 1,023,952 | 1/1953 | France. |
| 27,794 | 1896 | Great Britain. |

WARNER H. CAMP, Primary Examiner